Aug. 11, 1970 R. A. PALMER 3,523,700
PNEUMATIC HARNESS PLUG ASSEMBLY OR THE LIKE
Filed Sept. 12, 1966 5 Sheets-Sheet 1

INVENTOR
REED A. PALMER

BY
*Caudn & Caudn*

HIS ATTORNEYS

Aug. 11, 1970 R. A. PALMER 3,523,700
PNEUMATIC HARNESS PLUG ASSEMBLY OR THE LIKE
Filed Sept. 12, 1966 5 Sheets-Sheet 2

INVENTOR
REED A. PALMER

BY
Caudin & Caudin
HIS ATTORNEYS

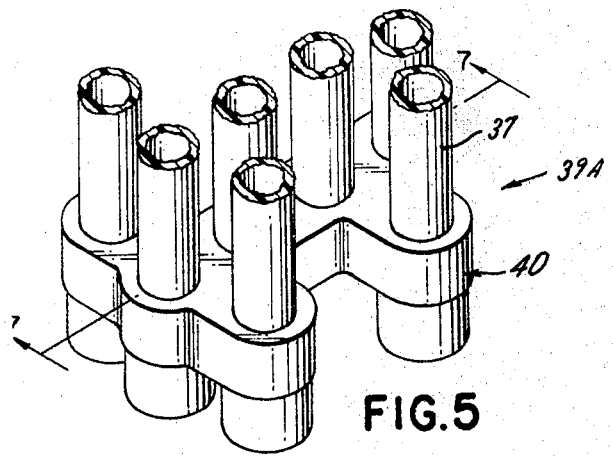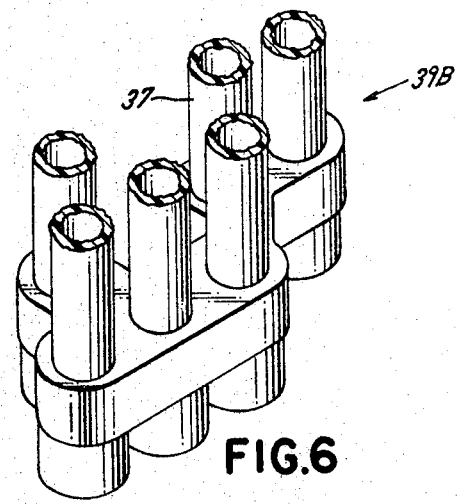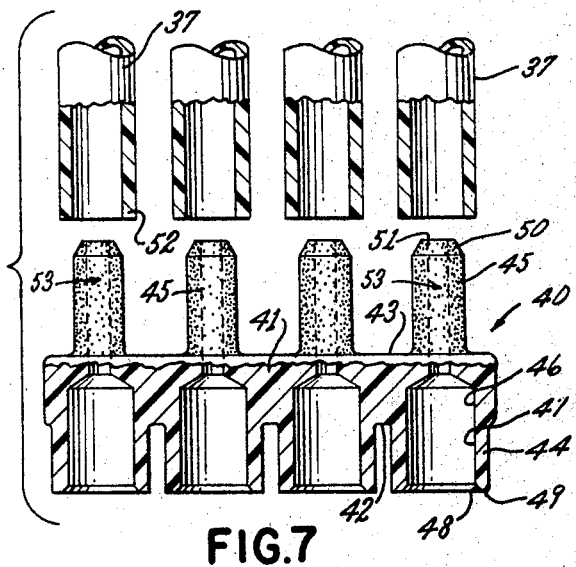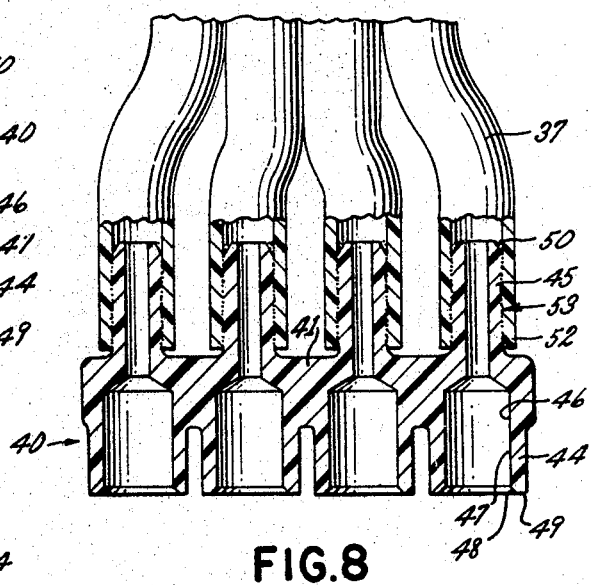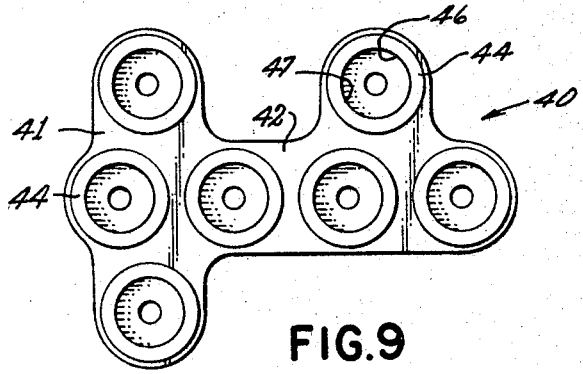

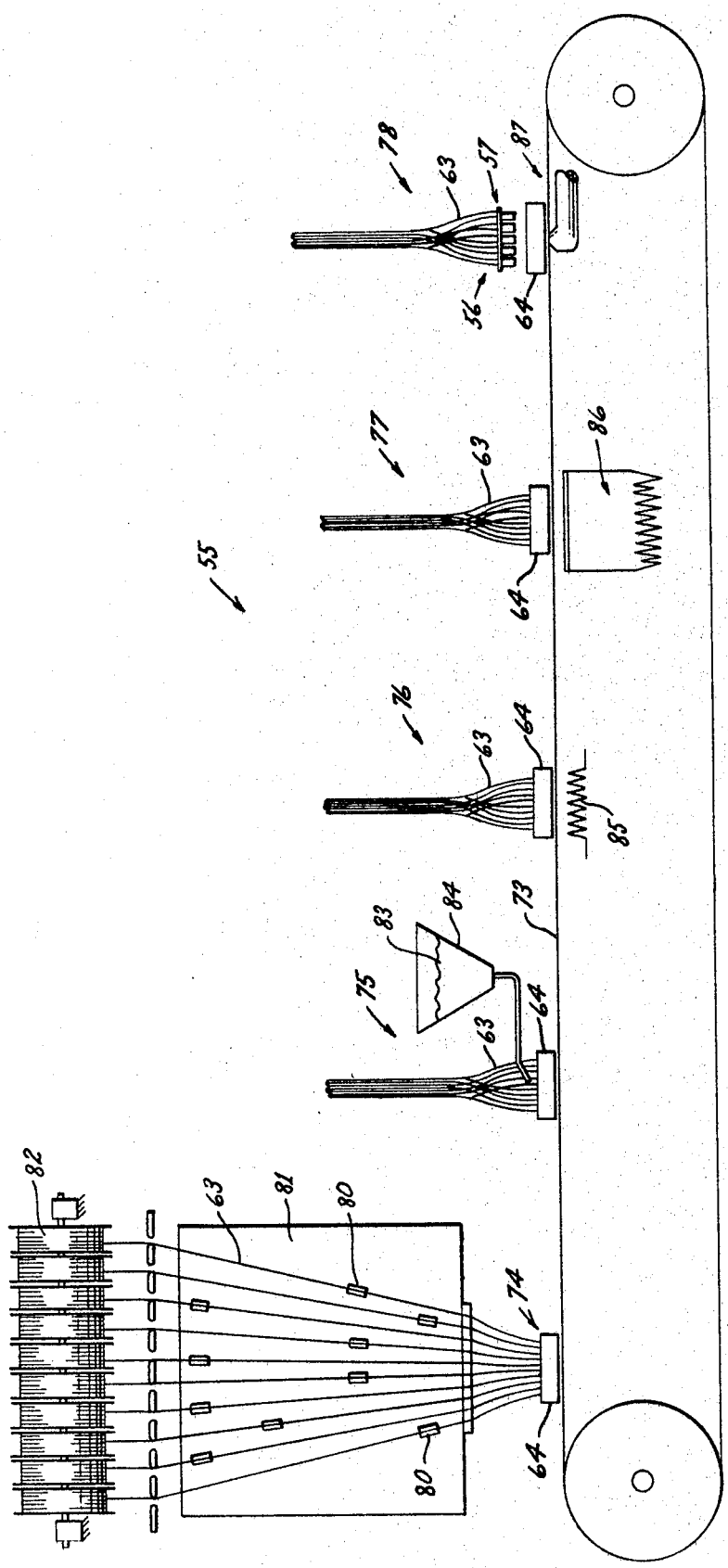

Aug. 11, 1970 — R. A. PALMER — 3,523,700

PNEUMATIC HARNESS PLUG ASSEMBLY OR THE LIKE

Filed Sept. 12, 1966 — 5 Sheets-Sheet 5

INVENTOR
REED A. PALMER

BY
HIS ATTORNEYS 12,345# United States Patent Office 3,523,700
Patented Aug. 11, 1970

3,523,700
PNEUMATIC HARNESS PLUG ASSEMBLY OR THE LIKE
Reed A. Palmer, Greensburg, Pa., assignor to Robertshaw Controls Company, Richmond, Va., a corporation of Delaware
Filed Sept. 12, 1966, Ser. No. 578,687
Int. Cl. F16l *39/02*
U.S. Cl. 285—137                                         6 Claims

ABSTRACT OF THE DISCLOSURE

This disclosure relates to a plug connector for interconnecting a plurality of conduit means to output passages of a pneumatic programmer, the plug connector having a flexible plate-like body portion with flexible extension means extending from one side thereof to be interconnected to the pneumatic programmer and a plurality of flexible conduits extending from the other side thereof to be interconnected to a plurality of pneumatically operated actuators. The flexible conduits are permanently secured to the flexible body portion of the plug connector so as to facilitate assembling with the pneumatic programmer.

---

This invention relates to an improved means for interconnecting a plurality of conduit means to a program controlling means for operating a plurality of pneumatically operated actuator means.

It has been found according to the teachings of this invention, that a relatively expensive assembly procedure has developed in interconnecting flexible conduit lines between a program control means and various pneumatically operated actuator means of a control system of an apparatus, such as domestic appliances and the like.

In particular, it is well known that such control means normally comprises a reading head structure having a plurality of fluid flow passage means respectively interrupting opposed surfaces of the reading head whereby the flexible conduits can be secured to nipple extension means on one surface of the reading head and a program control means can interconnect certain of the fluid flow passages together in a predetermined pattern on the other side of the reading head so that pneumatic fluid can be directed in a predetermined pattern to various pneumatically operated actuator means disposed remotely from the reading head and being interconnected thereto by the other ends of the flexible conduits.

This invention provides a harness plug assembly wherein a plug connector is provided and has the body portion thereof secured to one set of the ends of the flexible conduits and has integral means for interconnecting to the nipple side of the reading head whereby the assembly operation is greatly simplified and through a unique arrangement of the nipple means and plug connector of this invention, a more accurate and foolproof assembly operation is provided. Further, such pneumatic harness assembly of this invention substantially avoids conduit shake-off during subsequent shipment of the apparatus having such a control system.

Accordingly, it is an object of this invention to provide a harness plug assembly having one or more of the novel features set forth above or hereinafter shown or described.

Other objects, uses and advantages of this invention are apparent from a reading of this description which proceeds with reference to the accompanying drawings forming a part thereof and wherein:

FIG. 5 is a perspective view of one embodiment of the harness plug assembly of this invention.

FIG. 6 is a view similar to FIG. 5 and illustrates another embodiment of the harness plug assembly of this invention.

FIG. 7 is a fragmentary, partial cross-sectional view illustrating one of the steps in the method of this invention for forming the harness plug assembly of FIG. 5.

FIG. 8 is a view similar to FIG. 7 and illustrates the final step of the method of this invention for forming the harness plug assembly of FIG. 5.

FIG. 9 is a bottom view of the harness plug assembly of FIG. 5.

FIG. 10 is a schematic view illustrating another embodiment of the method of this invention wherein the harness plug assemblies of this invention can be substantially continuously made.

Figure 2:
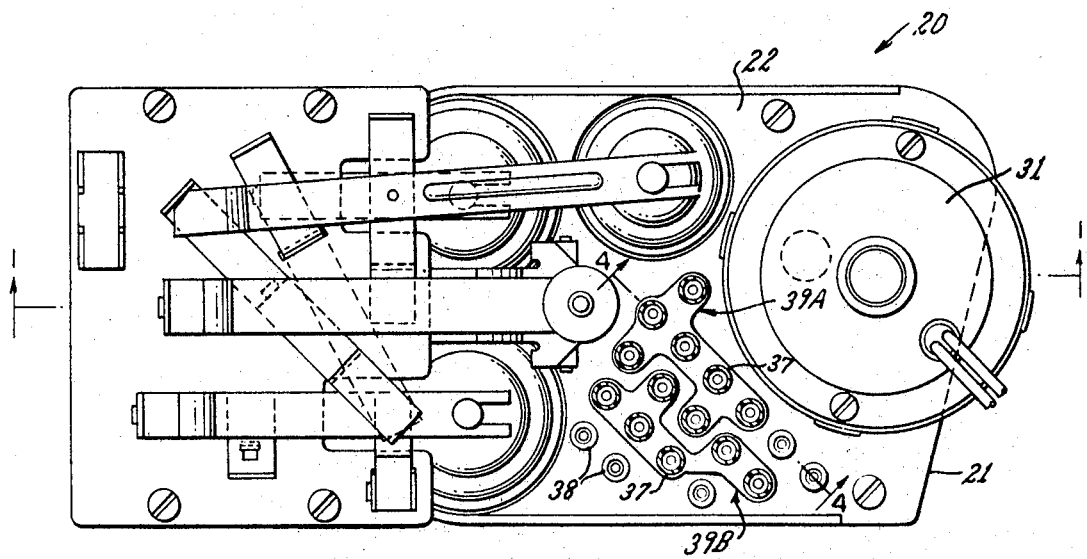
FIG. 2 is a rear view of the structure illustrated in FIG. 1.

While the various features of this invention are hereinafter described and illustrated as being particularly adaptable for providing a harness plug assembly means for a pneumatically operated control system for a domestic appliance or the like, it is to be understood that the various features of this invention can be utilized singly or in any combination thereof to provide a harness plug assembly means for other devices as desired.

Therefore, this invention is not to be limited to only the embodiments illustrated in the drawings, because the drawings are merely utilized to illustrate one of the wide variety of uses of this invention.

Figure 1:
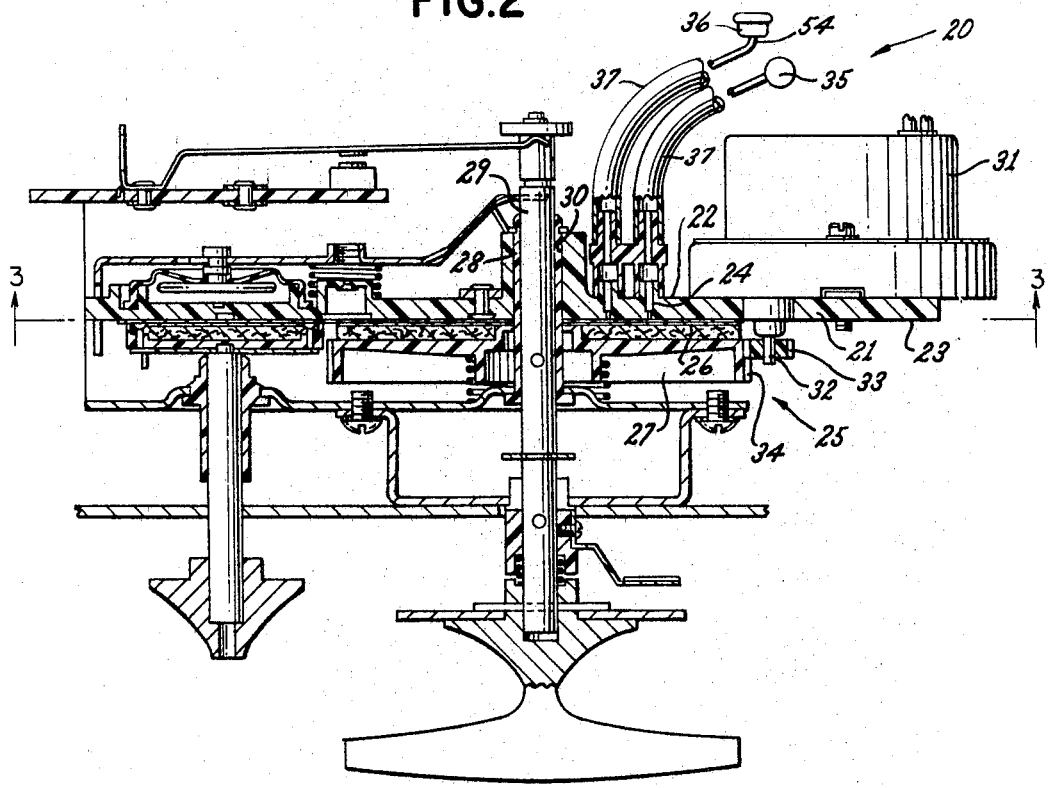
FIG. 1 is a cross-sectional view of a pneumatically operated control system of this invention, FIG. 1 being taken on line 1—1 of FIG. 2.
Figure 3:
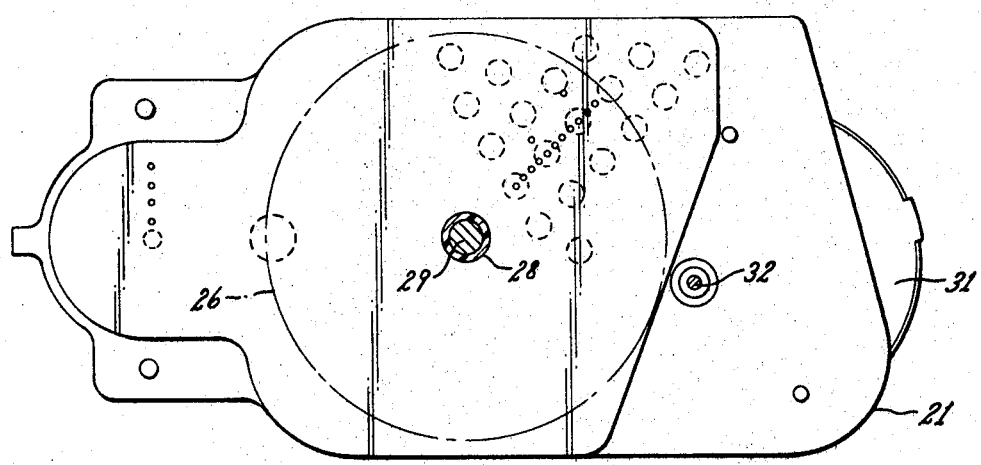
FIG. 3 is a cross-sectional view taken on line 3—3 of FIG. 1.

Referring now to FIGS. 1–4, a pneumatically operated program control system of this invention is generally indicated by the reference numeral 20 in FIG. 1 and includes a reading head plate or means 21 having opposed surfaces 22 and 23 respectively interrupted by a plurality of fluid flow passages 24.

A program controlling means 25 is mounted to the reading head 21 and comprises a flexible reading sheet 26 interconnected to a rigid backing member 27 to rotate in unison therewith relative to the reading head 21, the program controlling means 25 being interconnected to a bearing means 28 and an on-off shaft means 29 mounted for rotational movement in a transverse bore 30 passing through the reading head 21. The program means 25 is rotated relative to the reading head 21 by a suitable timer motor 31 having its output shaft means 32 driving a pinion gear 33 disposed in meshing relation with ring gear means 34 on the backing member 27 of the program controlling means 25.

The flexible reading sheet 26 of the program controlling means 25 has a plurality of raised blisters or channel means formed therein which are adapted to respectively interconnect together one or more of the fluid flow passages 24 passing through the reading head 21 in a predetermined pattern to interconnect a pneumatic source 35, such as the inlet of a vacuum pump or the like, to a pneumatically operated actuator means 36, such as a closed chamber of an actuator having a flexible diaphragm interconnected to suitable switch means or the like, to cause an operating function of the domestic appliance utilizing the control system 20 of this invention.

Because the actuator means 36, pneumatic source 35 and other devices are mounted remote from the reading head 21, a plurality of flexible conduit means 37 are utilized to fluidly interconnect such actuator means and the like to the reading head 21 in a manner now to be described.

Figure 4:
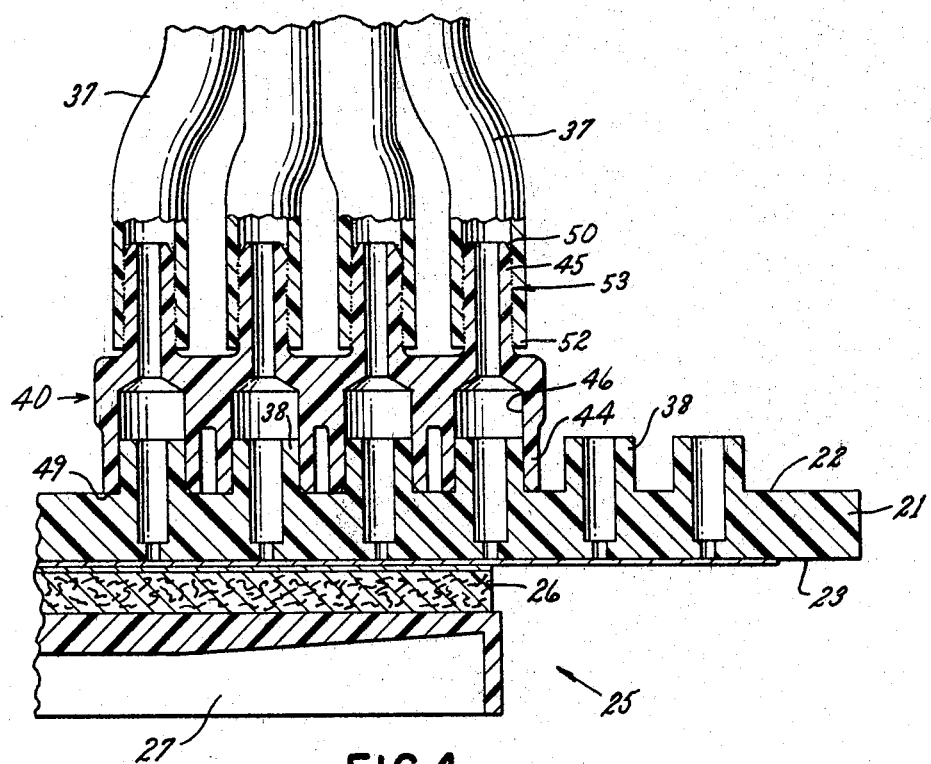
FIG. 4 is an enlarged, fragmentary, cross-sectional view taken on line 4—4 of FIG. 2.

As illustrated in FIGS. 1–4, the rear surface 22 of the reading head 21 is provided with a plurality of outwardly directed, substantially stubby and rigid nipples or tubular extensions 38 each having a fluid flow passage means 24 passing centrally therethrough in the manner illustrated in FIG. 4. While the reading head 21 and the nipples 38 can be formed in any suitable manner and of any suitable material, the embodiment of the reading head 21 utilized in the drawings has the reading head 21 and nipple means 38 formed as an integral structure and made from a substantially rigid plastic material.

The harness plug assembly means of this invention for interconnecting the fluid flow passage means 24 in the reading head 21 to the various actuator means 35, 36, etc., is generally indicated by the reference numeral 39A in FIG. 5 and the reference numeral 39B in FIG. 6 with the difference between the embodiments of FIGS. 5 and 6 merely being in the desired configuration thereof whereby only the harness plug assembly 39A and the method of making the same will be described as such structure and method would equally apply to the harness plug assembly 39B of FIG. 6.

As illustrated in FIG. 7, a plug connector 40 is provided and is formed from a substantially flexible plastic material molded into the configuration illustrated in FIG. 7 to define a body portion 41 having the desired configuration defined by opposed flat surface means 42 and 43. A plurality of relatively large tubular extensions 44 are formed integral with the body portion 41 and extend outwardly from the surface 42 thereof to provide integral means for interconnecting the plug connector 40 to the reading head 21 in a manner hereinafter described. An opposed set of tubular extensions 45 are formed integral with the body portion 41 of the plug connector 40 and extended outwardly from the surface 43 thereof in aligned relation with the opposed tubular extensions 44.

A plurality of passage means 46 pass transversely through the body portion 41 of the plug connector 40 and respectively through the aligned tubular extensions 44 and 45 thereof as fully illustrated in FIGS. 7 and 8, the passage means 46 passing through the tubular extensions 44 defining enlarged cylindrical portions 47 and outwardly beveled surfaces 48 adjacent the free ends 49 of the tubular extensions 44 while the tubular extensions 45 have beveled external surfaces 50 adjacent the free ends 51 thereof.

The flexible conduits 37 previously described have their free ends 52 telescoped over the tubular extensions 45 of the plug connector 40 in the manner illustrated in FIG. 8 whereby the beveled surfaces 51 on the tubular extension 45 facilitate such telescoping operation, the flexible conduits 37 being formed from a suitable flexible plastic and being adapted to be force-fitted over the tubular extensions 45 to interconnect the same together.

However, in order to insure a positive fluid seal between the flexible conduits 37 and the nipples 45 of the plug connector 40, the tubular extensions 45 are coated with a softening solvent prior to the assembly operation with the conduits 37 whereby the solvent, generally indicated by the reference numeral 53 in FIG. 7, causes subsequent bonding between the contacting surfaces of the flexible conduit 37 and nipples 35 in the manner illustrated in FIG. 8 to provide a substantially united harness plug assembly 39A as illustrated in FIG. 8 whereby the conduit 37 cannot be readily displaced from the plug connector 40.

After the harness plug assemblies 39A and 39B have been formed in the manner previously described, the harness plug assemblies 39A and 39B can be readily secured to the extending nipple means 38 of the reading head 21 by merely telescoping the integral tubular extensions 34 of the connectors 40 over the nipples 38 in the manner illustrated in FIGS. 2 and 4 whereby the beveled surfaces 49 in the tubular extensions 44 of the connectors 40 facilitate such telescoping operation and through the natural resiliency of the tubular extensions 44, the same are press-fitted over the nipples 38 to effectively interconnect the harness plug assembly 39A and 39B thereto.

In this manner, the required assembly operation to properly interconnect the respective conduits 37 in fluid communication with the fluid flow passages 24 passing through the reading head 21 will not be a time consuming operation and the chance for error as in the past is eliminated whereby relatively unskilled labor can be utilized to properly interconnect the harness plug assemblies 39A and 39B to the reading head 21. Further, because a large number of nipples 38 are interconnected to the assemblies 39A and 39B, there is less tendency for the assemblies 39A and 39B to be shaken-off during shipment of the apparatus as would be the situation when the conduits 37 are directly and individually connected to the nipples 38 as in the past.

Accordingly, it is obvious that the nipple arrangement 38 on the rear surface of the reading head 21 can be so constructed and arranged that the plug connector 40 can only be connected to the proper nipples 38 when the particular connector 40 is oriented relative thereto to only one position which will permit full connection between the connector 40 and the nipples 38.

Further, by proper coding of the conduit 37, the assembler can then interconnect the other ends 54 of the conduits 37 to the proper actuator means 36, 35, etc.

While one method has now been described for forming the harness plug assemblies of this invention, a more automatic and continuous method for forming similar types of harness plug assemblies will now be described and reference is made to FIGS. 10–16 wherein the method and apparatus of this invention is generally indicated by the reference numeral 55 in FIG. 10 to substantially continuously produce harness plug assemblies generally indicated by the reference numeral 56 in FIG. 11.

Figure 11:
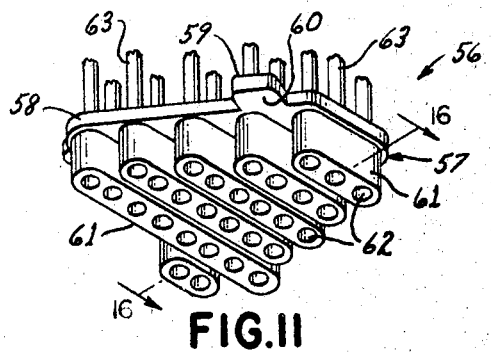
FIG. 11 is a bottom perspective view of another embodiment of the harness plug assembly of this invention formed by the method of FIG. 10.

As illustrated in FIG. 11, the embodiment of the harness plug assembly of this invention includes a plug connector 57 having a body portion 58 provided with opposed surfaces 59 and 60, the surface 60 carrying a plurality of integral means 61 for interconnecting the harness plug assembly 56 to the nipple means 38 of the reading head means 21 in substantially the same manner as previously described. However, the integral extension means 61 of the connector 57 each has a plurality of the fluid flow passage means 62 passing therethrough whereby the extensions 61 are tubular extensions each having a plurality of passages 62 passing therethrough. The flexible conduits 63 are interconnected to the other surface means 59 of the body portion 58 of the connector 57 in a manner hereinafter described and respectively have the passages thereof disposed in fluid communication with the passages 62 passing through the connector 57 for the purpose previously described.

Figure 13:
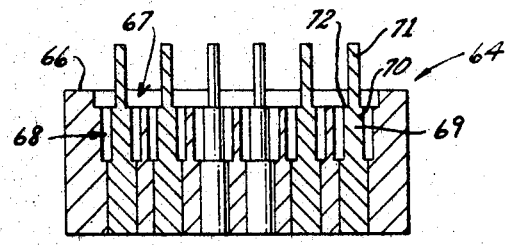
FIG. 13 is a cross-sectional view taken on line 13—13 of FIG. 12.
Figure 12:
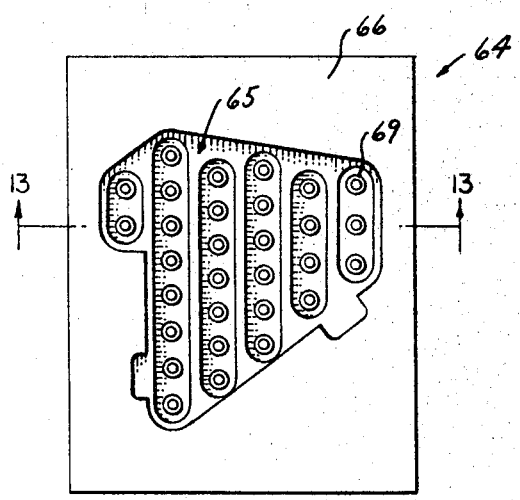
FIG. 12 is a top view of the mold assembly utilized in the method of FIG. 10.

The method and apparatus 55 for forming the harness plug assembly 56 includes mold means 64 illustrated schematically in FIG. 10 and in detail in FIGS. 12 and 13, the mold means 64 having a mold chamber 65 interrupting the top surface 66 thereof and including an upper chamber 67 for forming the body portion 58 of the connector 57 and lower chamber parts 68 for forming the extensions 61. In addition, a plurality of mandrel means 69 form part of the mold means 64, the mandrel means 69 having a lower cylindrical portion 70 for forming the passage means 62 through the extensions 61 in a manner hereinafter described and having upper smaller cylindrical portions 71 for positioning the conduits 63 in the mold chamber 65 in a manner hereinafter described. The parts 71 and 70 of each mandrel means 69 define a shoulder 72 therebetween for a purpose hereinafter described.

The mold means 64 of this invention are adapted to be serially moved from left to right in the apparatus 55 of this invention illustrated schematically in FIG. 10, such as being carried by a continuous conveyor belt means 73 progressively indexing each mold means 64 through station areas 74, 75, 76, 77 and 78.

As each mold member or means 64 arrives at station 74, the operator telescopes the free ends 79 of the desired conduits 63 onto the small cylindrical parts 71 of the mandrel means 69 until the ends 79 abut against the shoulders 72 thereof whereby the ends 73 are fully positioned within the mold chamber 65 of the mold member 64 in the desired predetermined relation. Since certain of the conduits 63 are only required to be of a certain length relative to the other conduits 63, the operator at the station 74 can properly position cutter means 80 on a holder means 81 with the conduits 63 respectively being drawn from free wheeling supply rolls 82.

Figure 14:
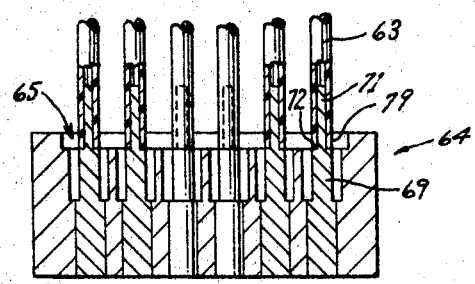
FIG. 14 is a view similar to FIG. 13 and illustrates one of the steps in the method of this invention.
Figure 16:
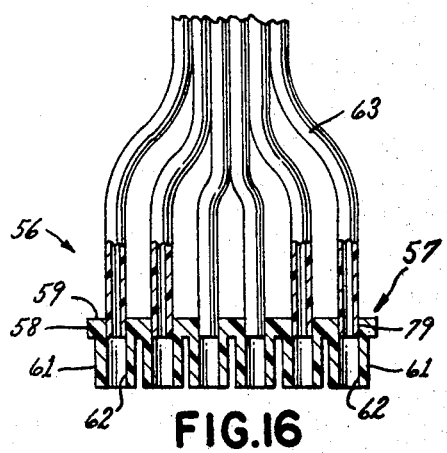
FIG. 16 is a fragmentary, cross-sectional view taken substantially on line 16—16 of FIG. 11.

Thus, when the conduits 63 have their ends 79 properly positioned on the mandrel means 69 in the manner previously described and as illustrated in FIG. 14, the operator can manually or automatically operate the cutters 80 to form the other free ends of the conduits 63 and sever the same from the respective supply rolls 82 thereof.

Figure 15:
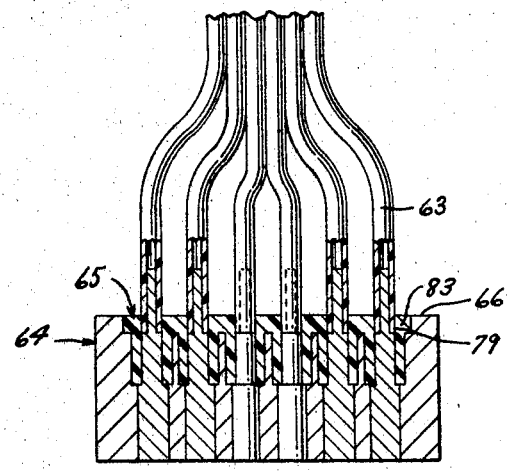
FIG. 15 is also a view similar to FIG. 13 and illustrates another step in the method of this invention.

Thereafter, the mold means 64 is indexed to the station 75 wherein a suitable liquid plastic material 83 is fed from a hopper means 84 into the mold chamber 65 to completely fill the same substantially to the level of the top surface 66 thereof in the manner illustrated in FIG. 15 whereby the ends 79 of the conduits 63 are fully submerged in the liquid mold material 83.

For example, the liquid plastic material 83 can comprise a vinyl plastisol that is 100% solids so shrinkage during subsequent curing thereof is very slight.

Thereafter, the filled mold means 64 is indexed to the station 76 wherein the liquid plastic material 83 is cured by a heating means 85 to substantially integrally interconnect and form the connector 57 to the conduits 63 whereby the conduits 63 effectively interrupt the top surface 59 of the connector 57 and are secured thereto as illustrated in FIG. 15, such curing temperatures being in the area of 325° F. or the like.

Subsequently, the mold means 64 is indexed to the station 77 wherein the molded assembly is cooled by suitable cooling means 86.

At subsequent station 78, suitable ejector means can be provided for ejecting the completed harness plug assembly 56 from the mold member 64 so that the mold member 64 can be indexed back to the station 74 for a subsequent molding operation in the manner previously described. For example, the ejection means of the station 78 can comprise an air blow-off means 87 to eject the finished harness plug assembly 56 from the chamber 65 of the mold means 64 in a manner well known in the art.

Obviously, the conduits 63 being fed from the supply roll 82 can be of different colors to aid the assembler in properly positioning the same on the mandrel means 69 of the mold means 64 as well as to interconnect the upper ends thereof to the subsequent pneumatically operated actuator means in the desired appliance or apparatus. Alternately, such conduit means 63 could be coded at the station 74 by tag means or the like as desired.

Therefore, it can be seen that this invention provides various methods and embodiments to facilitate the assembly operation between a program control means and the various actuators therefor in a simple and effective manner so that unskilled labor can be utilized and accuracy of assembling the system will be maintained.

Thus, this invention provides an improved harness plug assembly means for pneumatically operated control means.

While the form of the invention now preferred has been disclosed as required by the statues, other forms may be used, all coming within the scope of the claims which follow.

What is claimed is:

1. In combination, a plug connector having a flat plate-like flexible body portion provided with flat opposed sides spaced from each other by a continuous narrow peripheral side surface of said body portion, said body portion having a plurality of flexible integral means for interconnecting said plug connector to a device having fluid flow passages, said integral means extending outwardly from one of said opposed sides of said body portion and being inwardly offset from said peripheral side surface thereof, said body portion and said integral means having passage means therein to be respectively disposed in fluid communication with said fluid flow passages of said device when said plug connector is interconnected to said device by said integral means, and a plurality of conduit means respectively having ends thereof secured to said body portion at the other opposed side thereof in inwardly offset relation to said peripheral side surface thereof and in fluid communication with said passage means thereof whereby the other ends of said conduits can respectively fluidly interconnect said fluid flow passages of said device to pneumatically operated actuators.

2. A combination as set forth in claim 1 wherein said integral means each comprises a tubular extension for telescoping with a nipple means of said device.

3. A combination as set forth in claim 1 wherein said body portion of said plug connector has a plurality of tubular extensions extending from said other opposed side thereof and wherein said first-named ends of said conduits are respectively disposed in telescoped relation with said tubular extensions to interconnect said conduits to said plug connector.

4. A combination as set forth in claim 1 wherein said body portion of said plug connector has said other opposed side thereof interrupted by a plurality of openings and respectively receiving said first-named ends of said conduits to interconnect said conduits to said plug connector.

5. A combination as set forth in claim 1 wherein said plug connector is a flexible plastic material and wherein said conduits are flexible plastic material.

6. A combination as set forth in claim 1 wherein said integral means each has a plurality of said passage means passing therethrough.

(References on following page)

References Cited

UNITED STATES PATENTS

| | | | |
|---|---|---|---|
| 2,964,437 | 12/1960 | Appleton et al. | 285—137 X |
| 3,081,497 | 3/1963 | Scherry | 264—277 X |
| 3,179,443 | 4/1965 | Staffel | 285—137 X |
| 3,254,153 | 5/1966 | Kohler | 285—137 X |
| 3,263,520 | 8/1966 | Tschanz | 264—271 X |
| 3,284,589 | 11/1966 | Golden et al. | 137—625.11 X |
| 3,357,599 | 12/1967 | Douglas et al. | 251—149.7 |
| 3,254,153 | 5/1966 | Kohler | 285—137 X |
| 3,282,612 | 11/1966 | Younger | 285—137 |
| 3,381,977 | 5/1968 | Metzger | 285—137 X |
| 3,389,887 | 6/1968 | Antunez | 251—367 |

FOREIGN PATENTS 152,083   7/1950   Australia.

ROBERT F. WHITE, Primary Examiner

T. J. CARVIS, Assistant Examiner

U.S. Cl. X.R.

137—694.18; 264—248, 277; 285—423